A. A. PILE.
AUTOMATIC WEIGHING DEVICE.
APPLICATION FILED AUG. 23, 1912.
1,079,877.
Patented Nov. 25, 1913.
5 SHEETS—SHEET 1.
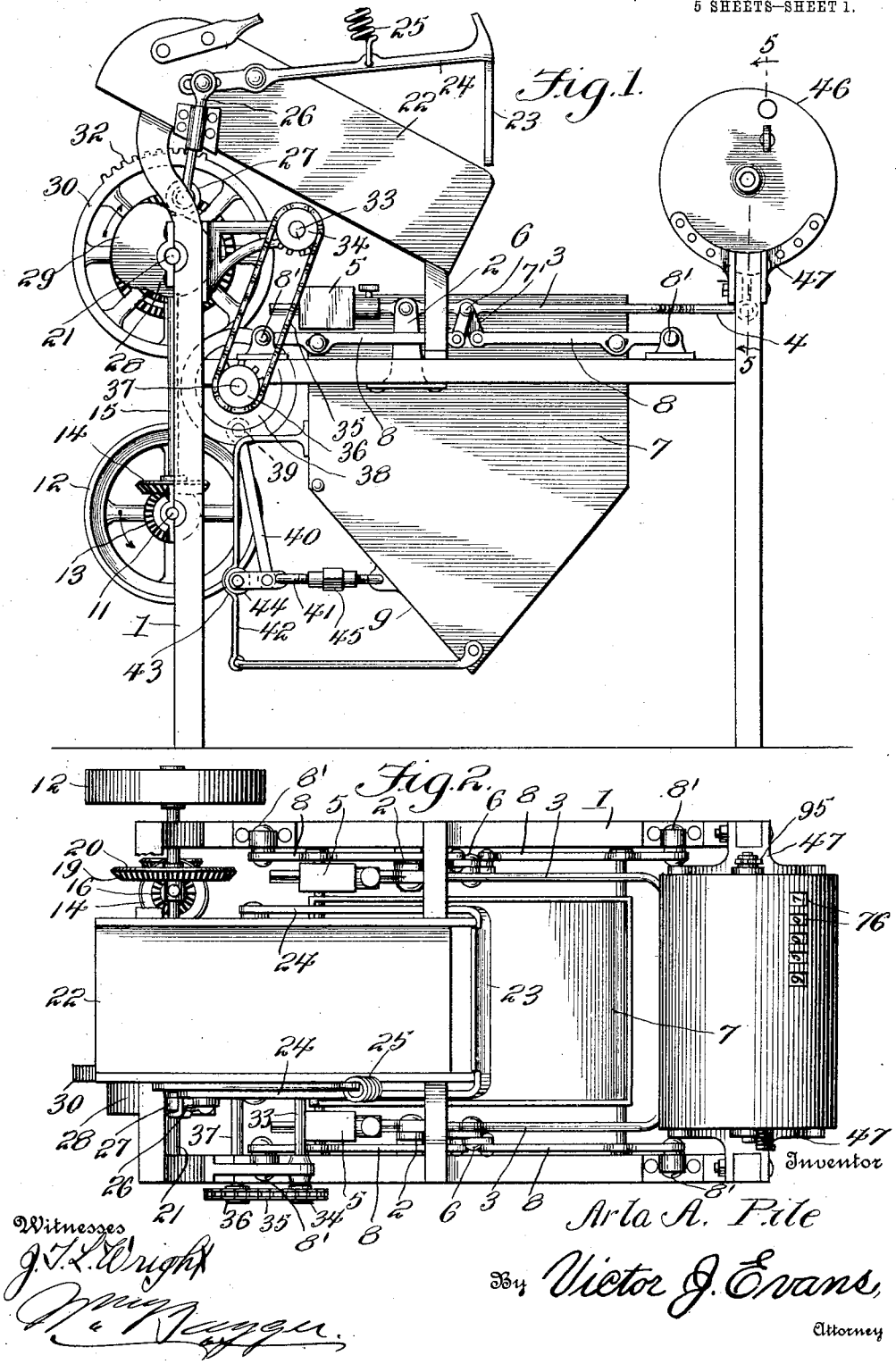

A. A. PILE.
AUTOMATIC WEIGHING DEVICE.
APPLICATION FILED AUG. 23, 1912.

1,079,877.  Patented Nov. 25, 1913.
5 SHEETS—SHEET 2.

A. A. PILE.
AUTOMATIC WEIGHING DEVICE.
APPLICATION FILED AUG. 23, 1912.
1,079,877.
Patented Nov. 25, 1913.
5 SHEETS—SHEET 3.
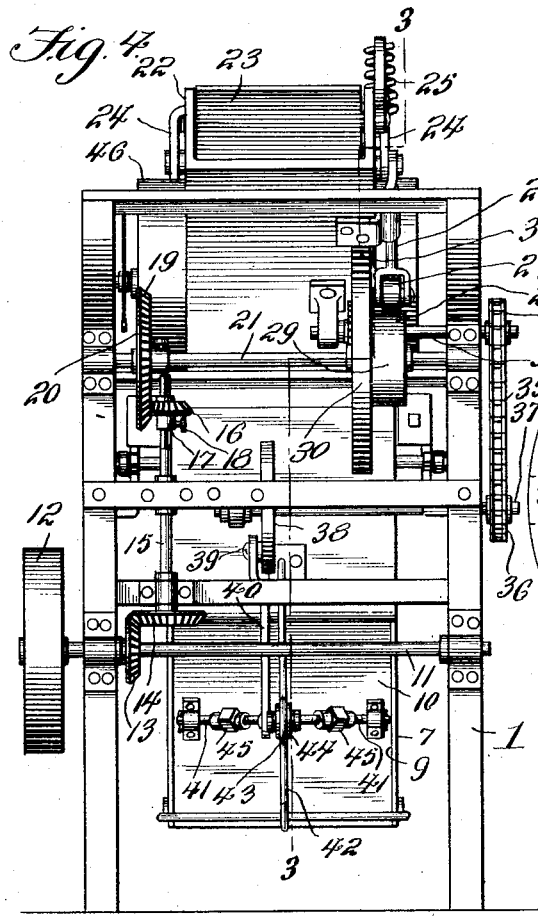
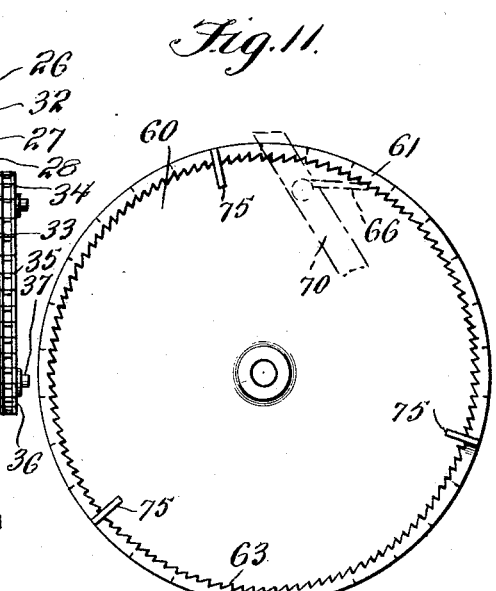
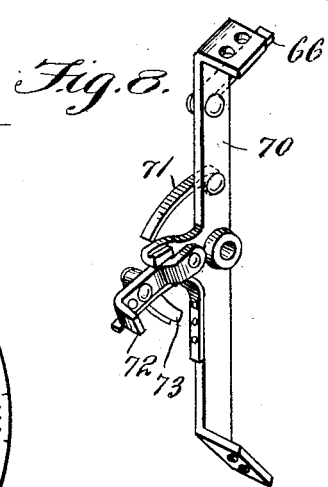
Witnesses
Inventor
Arla A. Pile,
By Victor J. Evans,
Attorney A. A. PILE.
AUTOMATIC WEIGHING DEVICE.
APPLICATION FILED AUG. 23, 1912.
1,079,877.
Patented Nov. 25, 1913.
5 SHEETS—SHEET 4.
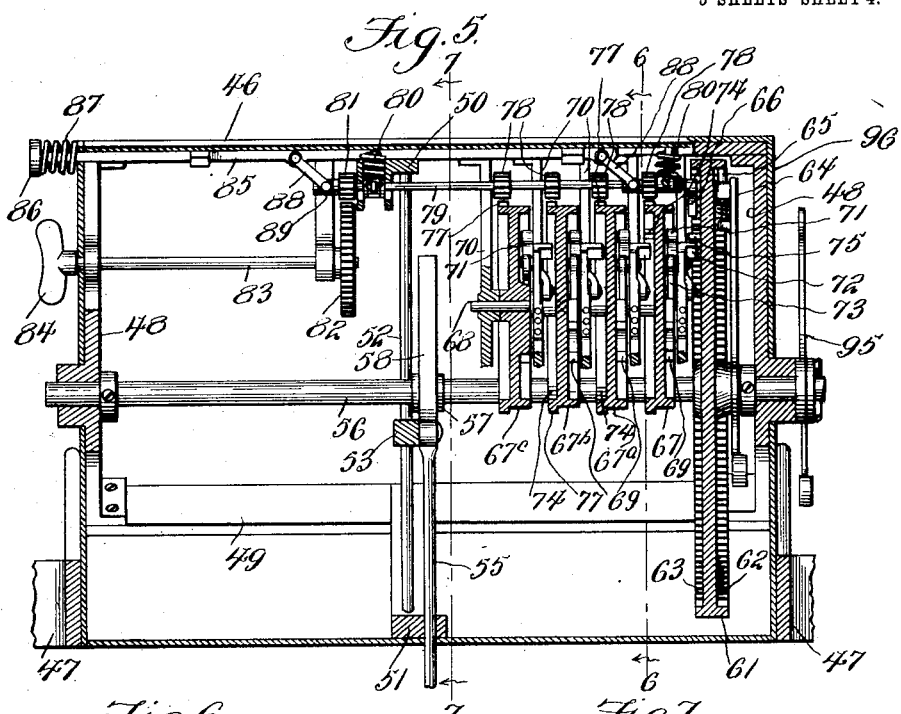
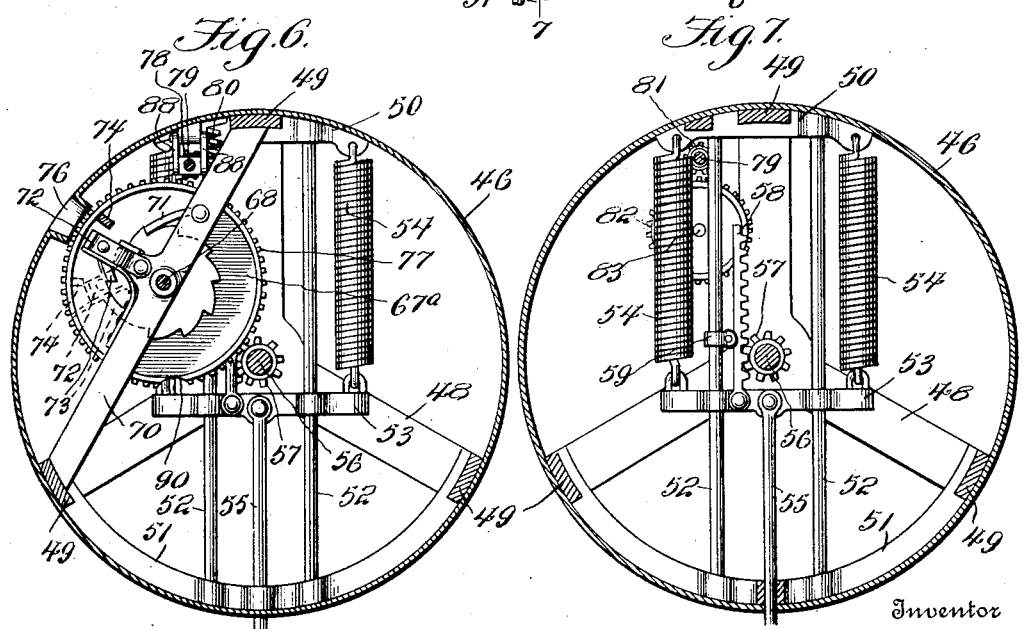
Witnesses
Inventor
Arla A. Pile,
By Victor J. Evans,
Attorney A. A. PILE.
AUTOMATIC WEIGHING DEVICE.
APPLICATION FILED AUG. 23, 1912.
1,079,877.
Patented Nov. 25, 1913.
5 SHEETS—SHEET 5.
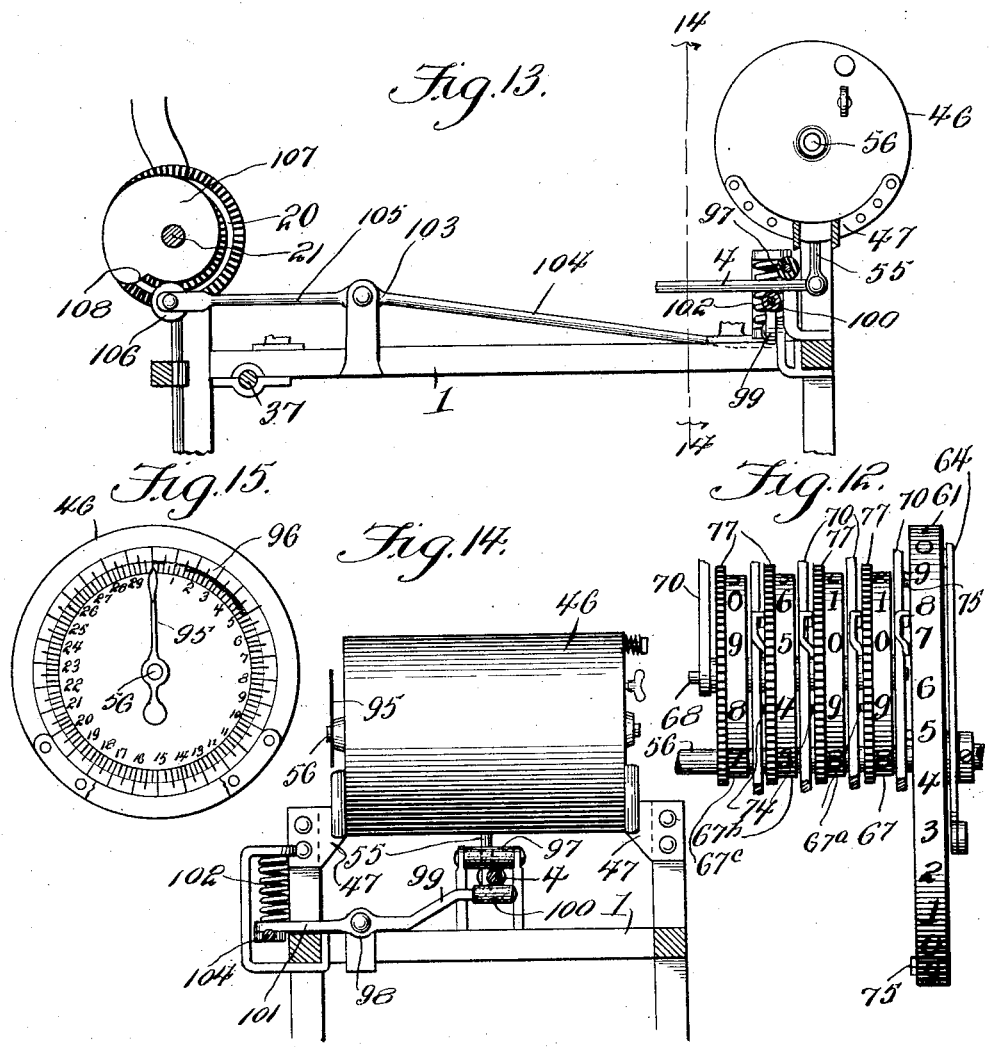

UNITED STATES PATENT OFFICE.

ARLA A. PILE, OF CHATTANOOGA, OKLAHOMA.

AUTOMATIC WEIGHING DEVICE.

1,079,877.  Specification of Letters Patent.  Patented Nov. 25, 1913.

Application filed August 23, 1912. Serial No. 716,686.

*To all whom it may concern:*

Be it known that I, ARLA A. PILE, a citizen of the United States, residing at Chattanooga, in the county of Comanche and State of Oklahoma, have invented new and useful Improvements in Automatic Weighing Devices, of which the following is a specification.

This invention relates to devices for weighing various articles, such as grain, cotton seed and the like, and it has for its object to provide a combined weighing and registering device of simple and improved construction which will accurately weigh material passing therethrough and constantly indicate upon the registering device the quantity of material weighed.

A further object of the invention is to provide a simple and improved device of the class described wherein the exact quantity of material weighed shall be constantly indicated in contradistinction to devices of this class where the position of the indicating register is affected only at each discharge of the weighing or measuring bucket or vessel.

Further objects of the invention are to simplify and improve the general construction and operation of a device of the character described.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

Figure 3:
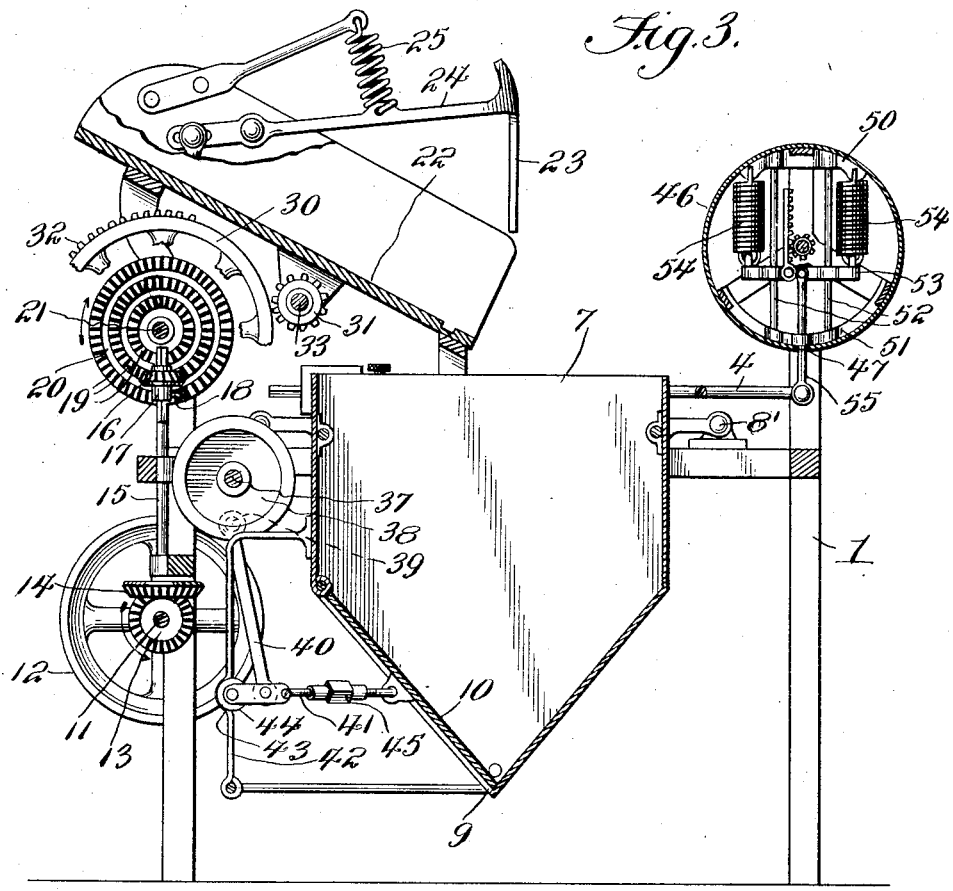
Figure 9:
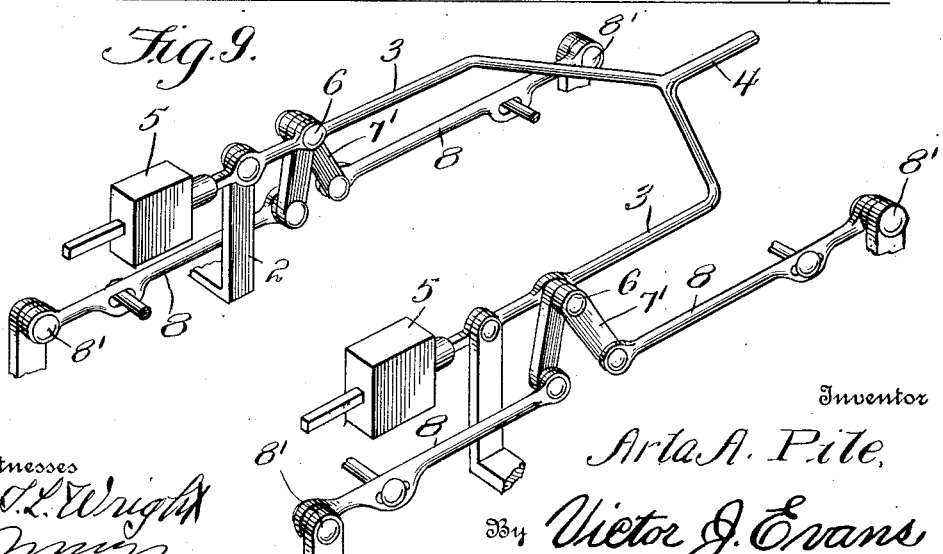

In the drawings,—Figure 1 is a side elevation of a device constructed in accordance with the invention, parts having been broken away to expose the interior construction. Fig. 2 is a top plan view of the weighing apparatus. Fig. 3 is a vertical sectional view taken on the line 3—3 in Fig. 4. Fig. 4 is a rear elevation. Fig. 5 is a vertical sectional view taken through the registering device on the line 5—5 in Fig. 1, on an enlarged scale. Fig. 6 is a sectional view taken on the line 6—6 in Fig. 5. Fig. 7 is a vertical sectional view taken on the line 7—7 in Fig. 5. Fig. 8 is a perspective view of one of the stays or braces supporting the tally wheels. Fig. 9 is a perspective detail view of the scale beam and related parts. Fig. 10 is a side elevation, showing one side or face of the units wheel detached. Fig. 11 is a side elevation, showing the opposite side of the units wheel. Fig. 12 is a face view in elevation of the tally wheels removed from the casing. Fig. 13 is a detail view in sectional elevation showing a safety device for preventing the rebound or recoil of the scale beam when the hopper is emptied. Fig. 14 is a sectional detail view taken on the line 14—14 in Fig. 13. Fig. 15 is a view in elevation showing one end of the drum or casing containing the tally wheels.

Corresponding parts in the several figures are denoted by like characters of reference.

The outer frame or casing 1 of the improved apparatus may constitute a portion of a chute or duct through which material may be conducted from a source of supply to a storage place or other suitable point of discharge. This casing may be of any suitable construction that will adapt it to support and to coöperate with other parts of the device. The casing is provided with brackets 2 upon which the arms 3 of a bifurcated scale beam 4 are fulcrumed, said arms being provided with adjusting weights 5. The arms 3 of the scale beam are provided with trunnions or pivot members 6 which are connected by means of links 7' with the ends of arms or levers 8 fulcrumed on the frame of the casing at 8', said levers serving to support the receiving vessel or bucket 7 which may be connected with or suspended from said levers in any convenient well known manner, in such a fashion that the said bucket may be counterbalanced by the weights 5. The bucket 7 has a discharge opening 9 which is adapted to be obstructed by a hinged valve or door member 10.

Supported for rotation on the casing 1 is a driven shaft 11 having a band wheel or pulley 12 adapted to receive motion from any suitable source of power. The shaft 11 also carries a miter gear 13 meshing with a miter gear 14 on a suitably supported shaft 15 upon which a pinion 16 is slidably and adjustably mounted, said pinion being provided with a hub 17 having a set screw 18, whereby it may be secured in adjusted position. The pinion 16 is adapted to be placed in mesh with any one of a plurality of series of teeth or cogs 19 on a wheel or disk 20 which is mounted on a counter shaft 21, it being obvious that the series of cogs 19 are concentric with each other and also that by proper adjustment of the pinion 16 the speed of the shaft 21 relative to that of the shaft 15 may be varied.

A feed chute 22, which is supported above and in suitable relation to the bucket 7 is equipped with an obstructing valve 23 carried by pivotally supported arms or levers 24 which are actuated by a spring 25 whereby the valve 23 is normally supported in non-obstructing position. One of the supporting arms or levers 24 carries a rod 26 which may be equipped with an anti-friction member, such as a roller 27, the end of the rod 26 carrying the anti-friction member being placed in engagement with a wheel 28 mounted on the shaft 21 and having a cam 29 in the path of which the said rod is located so that by the rotation of the shaft the cam 29 will engage the rod 26, thereby tilting or tripping the valve supporting levers 24 and carrying the valve 23 to an obstructing position with reference to the chute 22. The valve remains in an obstructing position as long as the rod 26 is engaged by the cam 29; when the latter passes out of engagement with the rod, the valve is restored to its normal unobstructing position by the action of the spring 25.

The shaft 21 carries a mutilated gear 30, the toothed portion of which is adapted to mesh with a spur wheel 31 which is preferably of such dimensions as to be caused to make one complete revolution at each engagement with the toothed portion 32 of the gear 30. Said toothed portion extends around a comparatively small portion of the perimeter of the wheel 30, and said toothed portion is so arranged that its engagement with the spur wheel 31 shall be contemporaneous with the engagement of the valve actuating rod 26 by the cam 29. The spur wheel 31 is supported on a shaft 33, which latter carries also a sprocket wheel 34 which is connected by a chain or link belt 35 with a sprocket wheel 36 on a shaft 37. A wheel or disk 38 which is mounted on the shaft 37 is provided with a wrist pin 39 connected by a pitman 40 with a link or bracket member 41 that is suitably connected with the door or valve 10 of the bucket 7, the arrangement being such that by each rotation of the wheel or disk 38, the door or valve will be opened and closed, permitting the contents of the bucket to escape by gravity through the opening 9. A resilient guide rod 42 is provided, the same having a recess or offset 43. At the junction of the pitman 40 with the link or bracket 41 is mounted an anti-friction member 44 consisting of a grooved roller which engages the guide member and which when the door or valve 10 is in an obstructing position is accommodated in the notch or recess 43, thereby preventing accidental displacement of the parts. The link or connecting member 41 is preferably bifurcated or Y-shaped, and the arms thereof are provided with turn buckles 45, whereby adjustment may be made to cause the door or valve 10 to fit tightly upon the bucket so as to avoid the possibility of leakage.

The weighing and registering mechanism is contained within a cylindrical drum or casing 46 which is supported relatively to the casing 1 by arms or brackets 47. The casing 46, which may be made of sheet metal, is reinforced at the ends or heads by means of spiders 48, the arms of which are connected by straps or brace members 49 extending longitudinally of the drum or casing. The longitudinal straps 49, which are three in number and which are disposed equidistantly around the circumference of the drum 46, serve to support an anchoring device comprising a head 50 which is secured upon the top brace 49, an arcuate base member 51 which is secured on the bottom braces 49 and vertical connecting rods 52. Slidably mounted on the rods 52 is a cross head 53 which is connected with the top member 50 by means of springs 54; the cross head 53 is also connected with the scale beam 4 by means of a link 55 which is guided through an aperture in the bottom of the drum. A shaft 56, which extends axially through the drum or cylinder 46 and which is supported for rotation in the hubs of the spiders 48, carries a pinion 57 meshing with a rack 58 which is pivotally associated with the cross head 53 and which is held in mesh with the pinion 56 by means of an anti-friction member 59 supported on one of the uprights 52. It is obvious from the foregoing that when the scale beam is depressed by the weight of material placed in the bucket 7, the cross head 53 will move downward on the guide rods 52, thereby tensioning the spring 54 to an extent commensurate with the quantity of material in the bucket 7. At the same time, the shaft 56 will be rotated by the action of the rack 58 engaging the pinion 56. When the contents of the bucket 7 are discharged the tension on the springs 54 will be relaxed, and the cross head 53 will be restored by the action of said springs to its initial position, together with the shaft 56, as will be readily understood.

Loosely mounted on the shaft 56 adjacent to one end of the casing is the units wheel 60 which may be of a diameter nearly equal to the internal diameter of the drum or casing. The units wheel 60 has a rim 61 which is provided adjacent to opposite sides or faces of the wheel with teeth or ratchets 62, 63. The teeth 62 adjacent to one face of the wheel are engaged by the operating arm 64 which may be inherently resilient, or it may be provided with a small spring actuated dog 65 to engage the teeth or ratchets 62. The teeth or ratchets 63 adjacent to the opposite side or face of the wheel 60 are engaged by a suitably arranged stop or check spring 66, whereby reverse rotation of the units wheel is prevented. Tally wheels, which have been shown as comprising a tens wheel 67, a hundreds wheel 67$^a$, a thousands wheel 67$^b$ and a ten-thousands wheel 67$^c$, are mounted for rotation on a shaft 68 which is supported above and in parallel relation to the shaft 56. The tally wheels, which are of similar construction, are each equipped with a ratchet wheel 69, having ten teeth or ratchets. The shaft 68 is supported by means of a plurality of stays or braces 70, one of which is located adjacent to each of the tally wheels, and said stays support check springs 71 that engage the ratchet wheels 69 which are associated with the tally wheels to prevent reverse rotation of the latter. Each of the stays also supports a pivoted spring actuated arm 72 carrying a spring actuated dog or pawl 73 that engages the proximate ratchet wheel 69 for the purpose of rotating the latter, step by step, when the arm or lever 72 is actuated. Each of the tally wheels, with the exception of the last of the series, (in the present instance the ten-thousands wheel) is equipped with a laterally extending pin or tappet member 74 adapted to engage the arm or lever 72 whereby the next tally wheel is actuated, it being obvious that the lever 72 actuating the hundreds wheel is disposed in the path of the tappet member 74 associated with the tens wheel, the arm or lever actuating the thousands wheel in the path of the tappet member associated with the hundreds wheel, and so on.

For the purpose of enabling a greater number than ten units to be registered at each operation, the units wheel is, as previously stated, made larger than the tally wheels; in the present instance, the circumference of the units wheel is approximately three times that of the tally wheels, and three series of units from 1 to 0 are inscribed upon the circumference of said units wheel, while each of the tally wheels has only the ten units inscribed upon the circumference thereof. The units wheel is also provided with three equi-distant tappet members 75 adapted to engage and actuate the arm or lever 72 carrying the pawl 73 whereby the tens is operated. The tappet members 75 are obviously to be so disposed that the tens wheel will be actuated at proper times and intervals. The units figures upon the circumferential faces of the units wheel and the several tally wheels are visible through a suitable slot or aperture 76 in the drum or casing 46.

For the purpose of restoring the tally wheels to normal or initial position, each of said tally wheels is provided with a circumferential series of fine spurs or teeth 77, the same being adapted to mesh with pinions 78 on a shaft 79. The shaft 79 is normally supported a short distance above the tally wheels by means of suitably arranged springs 80, whereby the pinions 78 will be normally kept out of mesh with the spurs 77, and an auxiliary pinion 81 on the shaft 79 will likewise be maintained out of mesh with a spur wheel 82 on a suitably supported shaft 83 having a key or handle 84 whereby it may be rotated. A slidably supported rod 85 having a handle 86 and actuated by a retracting spring 87 is connected by means of pivoted links 88 with collars 89 on the shaft 79 which rotates in said collars. Suitable means may be utilized to prevent the shaft 79 from being displaced longitudinally as well as for preventing the collars 89 from being displaced longitudinally with reference to the shaft. It will be seen that by pressing the handle of the rod 85, the links 88 will force the shaft 79 against the tension of the springs 81 until the pinions 78 and 81 are placed in mesh with the spurs 77 and 82, respectively. The spur wheel 82 is of relatively large diameter, so that a few rotations of said wheel will suffice to turn the tally wheels to a position wherein the ciphers "0" will register with and be visible through the sight slot or aperture 76. Each of the series of spurs 77 on the tally wheels is mutilated at a point of its circumference, as seen at 90, which is so located as to prevent the tally wheel from being further rotated by one of the pinions 78 when the normal or initial position has been reached, at which the cipher "0" is visible through the sight slot.

The shaft 56 carries at one end a hand or pointer 95 which is disposed adjacent to the outer face of one end or head 96 of the drum or casing 46. The face of the head 96, as seen in Fig. 15, constitutes a dial which is marked with units corresponding to those of the units wheel, the face of the dial being in the present instance subdivided into thirty units, each representing one pound. Each unit may, however, be subdivided to enable the exact contents of the bucket or receptacle to be ascertained. For the purpose of illustration some of the units have been shown; those subdivided into fourths representing quarter pounds, and some into sixteenths representing ounces.

It may be found desirable to provide a safety device to prevent the scale beam from rebounding after the bucket has been emptied and thus relieved of its weight.

When this is the case, the scale beam would naturally be restored by the action of the springs 54 to its initial position, but, especially under the impulse of the material first entering into the bucket, said material having accumulated while the preceding charge is being emptied, there will be a tendency for the scale beam to rebound against the tension of the springs 54 and again to return to the proper position, thereby registering something in excess of the proper quantity. To avoid this, the mechanism particularly illustrated in Figs. 13 and 14 has been provided. Said mechanism includes a buffer 97 supported in the path of the scale beam 4 to limit the movement thereof under the retracting action of the springs 54. A lever 98 which is fulcrumed at one side and at a suitable distance from the scale beam has an arm 99 that extends beneath the scale beam, said arm being provided with a cushion 100 engaging the scale beam. The other arm 101 of the lever 98 is extended in the path of a spring 102, the tension of which operates to hold the arm 99 of the lever in engagement with the underside of the scale beam. A suitably supported lever 103 has one arm 104 extended beneath the arm 101 of the lever 98. The other arm 105 of the lever 103 carries an anti-friction roller 106 which is disposed in the path of a cam wheel 107 which is mounted on the shaft 21, said cam wheel being in the shape of a spiral having an abrupt shoulder 108. It will be seen that the tension of the spring 102 will hold the anti-friction member 106 in engagement with the face of the cam wheel 107, and the shoulder of the latter is so positioned as to permit the anti-friction member to move in the direction of the axis of the shaft 20 at the time when the door of the bucket begins to open in order to discharge the contents thereof. When this takes place the spring 102 will actuate the lever 98 to cause the arm 99 of said lever to move the free end of the scale beam 4 into engagement with the buffer 97. Immediately following this however, the cam 107 will gradually actuate the lever 103, the arm of which, 104, will force the arm 101 of the lever 98 against the tension of the spring 102, compressing the latter and causing the arm 99 of the lever 98 to recede from the path of the scale beam, causing the latter to be actuated in the proper manner as soon as grain or other material enters into the bucket.

From the foregoing description, taken in connection with the drawings hereto annexed, the operation and advantages of this invention will be readily understood by those skilled in the art to which it appertains.

It will be seen that by each rotation of the shaft 33 the door or valve 10 of the bucket 7 will be actuated, that is to say, it will be opened and again shut, thereby causing the bucket to be emptied of its contents. While this operation takes place, the feed chute 22 is obstructed by the valve 23, and no material will pass into the bucket. The emptying of the bucket takes place intermittently at intervals which may be gaged by proper adjustment of the pinion 16 on the shaft 15. When material passes into the bucket over the chute 22, the scale beam 4 is depressed against the tension of the scale springs 54, and the shaft 56 carrying the operating arm 64 will be rotated, carrying with it the units wheel. Assuming the units to be pounds, it is evident that when ten pounds of material have been placed in the bucket, the tens wheel will be actuated one step or space by one of the tappet members 75 of the units wheel. The latter, however, may continue its rotation in one direction until the contents of the bucket is discharged, when, by the action of the springs 54, the parts will be restored to initial position with the exception of the units wheel which is held by the check spring 66, and also excepting such of the tally wheels as have been advanced or partially rotated. Following each discharge of the bucket, the total amount of material which has been weighed may be read through the sight slot 76. At any time while the operation is in progress the exact weight of the contents of the bucket will be indicated by the hand of the pointer 95 on the dial 96. The teeth or notches engaged by the operating arm 64 may be arranged four to each unit, as shown, or a greater number, if great accuracy shall be desired. For ordinary purposes four to each unit has, however, been thought to be sufficient, thus enabling the contents of each bucketful to be weighed accurately within one-quarter of the pound. The safety device illustrated in Figs. 13 and 14 will prevent rebound of the scale beam when the bucket is emptied of its contents, thereby preventing incorrect registration.

It will be readily seen that with this improved apparatus a certain quantity, such as a wagon load, or a number of loads coming from the same source, may be accurately weighed without necessity for leaving part of a bucketful to be guessed at or to be permitted to lap over. After each load or predetermined quantity has been weighed, the tally wheels may be easily and quickly restored to initial position, thus permitting the weighing of another lot to be proceeded with.

Having thus described the invention, what is claimed as new, is:—

1. A suitably supported weighing receptacle having a discharge opening, a hinged valve to obstruct said opening, a link connected with the valve, a wheel having a wrist pin, a pitman connecting the wrist pin with the link extending from the valve, anti-friction means supported at the junction of the link and the pitman, a resilient guide for said anti-friction means, and means for intermittently rotating the wheel having the wrist pin.

2. A suitably supported weighing receptacle having a discharge valve provided with a link, an intermittently operated pitman connected with said link, an anti-friction member at the junction of the link and the pitman, and a resilient guide for said anti-friction member, said guide having a recess engaging the anti-friction member to prevent displacement of the parts when the valve is in obstructing position.

3. A suitably supported weighing receptacle, a discharge valve for said receptacle, means for intermittently actuating the valve to discharge the contents of the receptacle, and means including a resilient guide coöperating with the actuating means and having a notch engaging the actuating means to prevent accidental opening of the valve.

4. A suitably supported weighing receptacle, a discharge valve hingedly connected therewith, a feed chute having a spring retracted obstructing valve, and constantly driven means for simultaneously operating the discharge valve and the obstructing valve at predetermined intervals, said means including a driving shaft, a counter shaft having a wheel provided with a plurality of concentric series of teeth, an upright shaft, miter gearing whereby said upright shaft receives motion from the driving shaft, and a pinion adjustably supported on the upright shaft and adapted to mesh with any one of the circumferential series of cogs.

5. In a device of the class described, a scale beam, a weighing receptacle supported thereby, constantly driven means for discharging the contents of the receptacle at predetermined intervals, a drum, an anchor within the drum including top and base members and a pair of uprights, a cross head slidable on the uprights, springs connecting the cross head with the top member of the anchor, a link connecting the cross head with the scale beam, a shaft supported axially within the drum, means associated with the cross head for rotating the shaft, a units wheel mounted loosely on the shaft, an operating arm carried by the shaft and engaging the units wheel to rotate the latter in one direction, and a spring to check reverse rotation of the units wheel.

6. In a device of the class described, a weighing receptacle, a scale beam supporting the same, a spring supporting the free end of the scale beam, a buffer located in the path of the scale beam, a spring actuated lever pressing the scale beam in the direction of the buffer, and means for gradually actuating the lever against the tension of the spring.

7. In a device of the class described, a weighing receptacle, a scale beam supporting the same, a spring supporting the free end of the scale beam, constantly driven means for intermittently discharging the contents of the receptacle, a buffer disposed in the path of the scale beam, a spring actuated lever engaging the scale beam to force it in the direction of the buffer, and means for actuating the lever against the tension of the spring to move it out of the path of the scale beam.

8. In a device of the class described, a weighing receptacle, a scale beam supporting the same, a spring supporting the free end of the scale beam, a buffer disposed in the path of the scale beam, a spring actuated lever engaging the scale beam to force it in the direction of the buffer, a second lever having an arm engaging an arm of the first mentioned lever to force it against the tension of its actuating spring, a cam wheel supported for rotation and engaging the second lever, and constantly driven means for intermittently discharging the contents of the weighing receptacle.

In testimony whereof I affix my signature in presence of two witnesses.

ARLA A. PILE.

Witnesses:
G. M. DAVIDSON,
WM. J. MURPHY.

---

Copies of this patent may be obtained for five cents each, by addressing the "Commissioner of Patents, Washington, D. C."